United States Patent
Li et al.

(10) Patent No.: US 11,770,757 B2
(45) Date of Patent: Sep. 26, 2023

(54) METHOD AND DEVICE FOR ACCESSING SYSTEM INFORMATION AREA OR NETWORK AREA

(71) Applicant: CHINA ACADEMY OF TELECOMMUNICATIONS TECHNOLOGY, Beijing (CN)

(72) Inventors: Hui Li, Beijing (CN); Qiubin Gao, Beijing (CN); Runhua Chen, Beijing (CN); Chuanjun Li, Beijing (CN); Xin Su, Beijing (CN); Yang Song, Beijing (CN); Rakesh Tamrakar, Beijing (CN); Yu Yang, Beijing (CN); Qiuping Huang, Beijing (CN); Mengjun Wang, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 0 days.

(21) Appl. No.: 16/317,945

(22) PCT Filed: Jul. 11, 2017

(86) PCT No.: PCT/CN2017/092447
§ 371 (c)(1),
(2) Date: Jan. 15, 2019

(87) PCT Pub. No.: WO2018/010629
PCT Pub. Date: Jan. 18, 2018

(65) Prior Publication Data
US 2019/0166545 A1      May 30, 2019

(30) Foreign Application Priority Data
Jul. 15, 2016    (CN) .......................... 201610561774.0

(51) Int. Cl.
*H04W 48/08*     (2009.01)
*H04L 27/26*     (2006.01)
*H04L 5/00*      (2006.01)

(52) U.S. Cl.
CPC .......... *H04W 48/08* (2013.01); *H04L 5/0094* (2013.01); *H04L 27/2666* (2013.01)

(58) Field of Classification Search
CPC ... H04L 27/2666; H04L 5/0094; H04W 48/08
See application file for complete search history.

(56) References Cited

U.S. PATENT DOCUMENTS

| | | | |
|---|---|---|---|
| 6,791,952 B2 * | 9/2004 | Lin .................... | H04W 72/0453 370/344 |
| 8,144,819 B2 * | 3/2012 | Baldemair .......... | H04L 27/2675 375/343 |

(Continued)

FOREIGN PATENT DOCUMENTS

| | | |
|---|---|---|
| CN | 101202585 A | 6/2008 |
| CN | 101662303 A | 3/2010 |

(Continued)

OTHER PUBLICATIONS

Extended European Search Report dated Apr. 15, 2019 for European Patent Application No. EP 17 82 6965.

(Continued)

*Primary Examiner* — Khaled M Kassim
*Assistant Examiner* — Berhanu D Belete
(74) *Attorney, Agent, or Firm* — HARNESS, DICKEY & PIERCE, P.L.C.

(57) ABSTRACT

A method and a device for accessing a system information area or a network area are provided. The method includes: receiving, by a terminal, at least one initial access signal (IAS) transmitted from the system information area or the network area; and obtaining, by the terminal, one or more of (Continued)

```
┌────────────────────────────────────────────────────┐  101
│ a terminal receives at least one initial access   │ /
│ signal (IAS) transmitted from a system            │
│ information area or a network area                │
└────────────────────────────────────────────────────┘
                        │
                        ▼
┌────────────────────────────────────────────────────┐  102
│ the terminal obtains one or more of a subframe    │ /
│ boundary, a system bandwidth, a starting          │
│ frequency and an ending frequency of the system   │
│ information area or the network area based on     │
│ the received IAS                                  │
└────────────────────────────────────────────────────┘
``` a subframe boundary, a system bandwidth, a starting frequency and an ending frequency of the system information area or the network area based on the received IAS.

20 Claims, 5 Drawing Sheets

(56) References Cited

U.S. PATENT DOCUMENTS

| | | | | |
|---|---|---|---|---|
| 9,307,559 | B2* | 4/2016 | McNamara | H04L 5/0048 |
| 10,567,049 | B2* | 2/2020 | Li | H03M 1/26 |
| 2008/0085727 | A1* | 4/2008 | Kratz | H04W 64/00 |
| | | | | 455/552.1 |
| 2008/0267303 | A1* | 10/2008 | Baldemair | H04L 27/2613 |
| | | | | 375/E1.003 |
| 2010/0322174 | A1* | 12/2010 | Ji | H04W 74/006 |
| | | | | 370/329 |
| 2012/0002643 | A1* | 1/2012 | Chung | H04W 74/0833 |
| | | | | 370/331 |
| 2012/0208581 | A1* | 8/2012 | Ishida | H04L 5/0023 |
| | | | | 455/509 |
| 2013/0005344 | A1* | 1/2013 | Dimou | H04W 36/00835 |
| | | | | 455/436 |
| 2013/0089067 | A1* | 4/2013 | Ji | H04W 56/00 |
| | | | | 370/336 |
| 2013/0229953 | A1* | 9/2013 | Nam | H04W 72/27 |
| | | | | 370/280 |
| 2014/0050206 | A1* | 2/2014 | Seo | H04J 11/0069 |
| | | | | 370/336 |
| 2014/0169361 | A1* | 6/2014 | Kim | H04W 56/0015 |
| | | | | 370/350 |
| 2015/0003416 | A1* | 1/2015 | Chung | H04L 5/0098 |
| | | | | 370/331 |
| 2015/0016339 | A1* | 1/2015 | You | H04W 56/0015 |
| | | | | 370/328 |
| 2015/0055632 | A1* | 2/2015 | Gou | H04L 27/2601 |
| | | | | 370/336 |
| 2015/0103800 | A1* | 4/2015 | Seo | H04W 48/10 |
| | | | | 370/329 |
| 2015/0208372 | A1* | 7/2015 | You | H04J 11/0069 |
| | | | | 370/350 |
| 2015/0359003 | A1* | 12/2015 | Kim | H04W 74/008 |
| | | | | 370/336 |
| 2016/0142989 | A1 | 5/2016 | Hashemi et al. | |
| 2016/0227451 | A1* | 8/2016 | Chung | H04L 5/001 |
| 2016/0338056 | A1* | 11/2016 | Xue | H04W 4/06 |
| 2016/0374035 | A1* | 12/2016 | Wang | H04W 56/0005 |
| 2017/0064685 | A1* | 3/2017 | Rico Alvarino | H04B 7/0456 |
| 2017/0094621 | A1* | 3/2017 | Xu | H04W 56/001 |
| 2017/0188319 | A1* | 6/2017 | Seo | H04W 56/001 |
| 2017/0201968 | A1* | 7/2017 | Nam | H04B 7/0632 |
| 2017/0202043 | A1* | 7/2017 | Seo | H04W 16/14 |
| 2017/0238272 | A1* | 8/2017 | You | H04L 5/001 |
| | | | | 370/350 |
| 2017/0311276 | A1* | 10/2017 | Tsai | H04W 56/001 |
| 2017/0325260 | A1* | 11/2017 | Guo | H04L 5/0082 |
| 2017/0359791 | A1* | 12/2017 | Onggosanusi | H04L 27/2613 |
| 2018/0279403 | A1* | 9/2018 | Kim | H04W 76/15 |
| 2018/0287846 | A1* | 10/2018 | Kim | H04W 72/20 |
| 2019/0058516 | A1* | 2/2019 | Yang | H04W 74/0841 |
| 2019/0090218 | A1* | 3/2019 | Noh | H04W 72/23 |
| 2020/0077354 | A1* | 3/2020 | Onggosanusi | H04L 27/26025 |
| 2020/0305098 | A1* | 9/2020 | Kim | H04W 72/0446 |

FOREIGN PATENT DOCUMENTS

| | | |
|---|---|---|
| CN | 103718612 A | 4/2014 |
| WO | WO-2014/163543 | 10/2014 |
| WO | WO-2015/080646 | 6/2015 |
| WO | WO-2015/109866 A1 | 7/2015 |

OTHER PUBLICATIONS

Qualcomm Incorporated, "NB-PSS and NB-SSS Design (Revised)", 3GPP TSG RAN WG1 NB-IoT Ad-Hoc Meeting, Mobile Competence Centre, Sophia-Antipolis Cedex, France, Mar. 22-24, 2016.

International Search Report PCT/ISA/210 for International Application No. PCT/CN2017/092447 dated Sep. 28, 2017.

Japanese Office Action dated Dec. 7, 2020 for Japanese Application No. 2019-501987.

* cited by examiner

METHOD AND DEVICE FOR ACCESSING SYSTEM INFORMATION AREA OR NETWORK AREA

CROSS-REFERENCE TO RELATED APPLICATIONS

This application is a national phase under 35 U.S.C. § 371 of PCT International Application No. PCT/CN2017/092447 which has an International filing date of Jul. 11, 2017, which claims priority to Chinese Patent Application No. 201610561774.0, filed Jul. 15, 2016, the entire contents of each of which are hereby incorporated by reference.

TECHNICAL FIELD

The present disclosure relates to the field of communication technology, in particular to a method and a device for accessing a system information area or a network area.

BACKGROUND

A wireless communication system may include one or more stations (such as base stations Nodes) to perform downlink transmissions and uplink receptions with User Equipment (UE). After initiating, the UE needs to find at least one station and accesses a network through the station. If a network includes multiple stations, the UE may access the network through an arbitrary station of the multiple stations. For example, each station in a cellular network may be configured as one cell, each cell transmits a signal independently, and the UE detects signals from different cells and selects one of the cells to access the network, such procedure is called as initial access.

Primary synchronization signal/secondary synchronization signal (PSS/SSS) in an LTE system has a bandwidth of 6 physical resource blocks (PRBs), i.e., 900 KHz. The PSS/SSS is restrained to be transmitted in a center of a bandwidth of each cell. Each cell transmits one PSS/SSS and the PSS/SSS needs to be received by each user in a system information area or a network area. The bandwidth of one cell may be, for example, 1.4 MHz, 5 MHz, 10 MHz, 15 MHz, 20 MHz and so on. When the UE initiates and before the UE accesses any cell, the UE is neither aware of the bandwidth of the cell nor aware of a position of a center of a frequency band of the cell. The UE may search central frequency points of all possible cells using a resolution of 100 KHz. If the UE finds one PSS/SSS, the UE successfully detects the central frequency point of a cell, demodulates a master information block of the cell and then obtains a starting frequency position and an ending frequency position of the cell, where the mater information block carries information about a system bandwidth of the cell.

Existing systems are mainly deployed in low frequency bands and the quantity of antennas at a station side is relatively small. Future systems may be deployed based on large bandwidths from 0.4 GHz to 100 GHz, channel performance in a low frequency band significantly differ from that in a high frequency band, a pathloss of the high frequency band is much higher than that of the low frequency band, a coverage of the cell is severely decreased, and therefore, a new synchronization signal and a new initial access signal should be designed to ensure a sufficient network coverage. In addition, the quantity of antennas of a future system may be greatly increased to hundreds or even thousands, such a great number of antennas may generate narrow beamforming using a beamforming technique. Although coverage with a beam may be enhanced by a beam gain, an angle covered by each beam turns smaller as the beam turns narrower, so the cell requires multiple beams orienting different directions to achieve a whole cell coverage.

Therefore, the existing design cannot meet requirements of the future systems, and effects caused by the deployment should be taken into consideration in designing the synchronization and initial access signal for the future system.

SUMMARY

In view of the above technical problem, the present disclosure provides in some embodiments a method and a device for accessing a system information area or a network area, which may solve the problem that an existing design cannot satisfy requirements of future systems.

In a first aspect, a method for accessing a system information area or a network area is provided. The method includes: receiving, by a terminal, at least one initial access signals (IAS) transmitted from the system information area or the network area; and obtaining, by the terminal, one or more of a subframe boundary, a system bandwidth, a starting frequency and an ending frequency of the system information area or the network area based on the received IAS.

Optionally, the obtaining, by the terminal, one or more of the subframe boundary, the system bandwidth, the starting frequency and the ending frequency of the system information area or the network area based on the received IAS includes: obtaining, by the terminal, the subframe boundary of the system information area or the network area based on a pre-defined transmitting position for the IAS in a subframe; or obtaining, by the terminal, the system bandwidth, the starting frequency and/or the ending frequency of the system information area or the network area based on a pre-defined mapping relationship between the IAS and the system bandwidth; or demodulating, by the terminal, a signal in addition to the IAS corresponding to the IAS based on a pre-defined time-frequency relationship between the IAS and the signal in addition to the IAS to obtain the system bandwidth, the starting frequency and/or the ending frequency of the system information area or the network area, where the signal in addition to the IAS includes the system bandwidth, the starting frequency and/or the ending frequency of the system information area or the network area.

Optionally, the IAS is transmitted at any frequency position or a predefined frequency position in a bandwidth occupied by the system information area or the network area, and the transmitting position for the IAS in a subframe is pre-defined by the system information area or the network area with a user.

Optionally, multiple IASs are distinguished from each other using any one or combination of time division multiplexing, frequency domain multiplexing and code division multiplexing.

Optionally, the system information area or the network area is formed by one or more stations and each of the at least one IAS is transmitted by one of the stations or a group of the stations.

In a second aspect, it is further provided a method for accessing a system information area or a network area. The method includes: determining, by the system information area or the network area, at least one initial access signal (IAS); and transmitting the IAS by the system information area or the network area, to enable a terminal having received the IAS to obtain one or more of a subframe boundary, a system bandwidth, a starting frequency and an ending frequency of the system information area or the network area based on the received IAS.

Optionally, the transmitting the IAS by the system information area or the network area, to enable the terminal having received the IAS to obtain one or more of the subframe boundary, the system bandwidth, the starting frequency and the ending frequency of the system information area or the network area based on the received IAS includes: transmitting the IAS by the system information area or the network area, to enable the terminal having received the IAS to obtain the subframe boundary of the system information area or the network area based on a pre-defined transmitting position for the IAS in a subframe; or to enable the terminal having received the IAS to obtain the system bandwidth, the starting frequency and/or the ending frequency of the system information area or the network area based on a pre-defined mapping relationship between the IAS and the system bandwidth; or to enable the terminal having received the IAS to demodulate a signal in addition to the IAS corresponding to the IAS based on a pre-defined time-frequency relationship between the IAS and the signal in addition to the IAS, to obtain the system bandwidth, the starting frequency and/or the ending frequency of the system information area or the network area, where the signal in addition to the IAS includes the system bandwidth, the starting frequency and/or the ending frequency of the system information area or the network area.

Optionally, the IAS is transmitted at any frequency position or a predefined frequency position in a bandwidth occupied by the system information area or the network area, and the transmitting position for the IAS in a subframe is pre-defined by the system information area or the network area with a user.

In a third aspect, it is further provided a device for accessing a system information area or a network area. The device includes: a receiving module, used to receive at least one initial access signal (IAS) transmitted from the system information area or the network area; and an obtaining module, used to obtain one or more of a subframe boundary, a system bandwidth, a starting frequency and an ending frequency of the system information area or the network area based on the received IAS.

Optionally, the obtaining module is further used to: obtain the subframe boundary of the system information area or the network area based on a pre-defined transmitting position for the IAS in a subframe; or obtain the system bandwidth, the starting frequency and/or the ending frequency of the system information area or the network area based on a pre-defined mapping relationship between the IAS and the system bandwidth; or demodulate a signal in addition to the IAS corresponding to the IAS based on a pre-defined time-frequency relationship between the IAS and the signal in addition to the IAS, to obtain the system bandwidth, the starting frequency and/or the ending frequency of the system information area or the network area, where the signal in addition to the IAS includes the system bandwidth, the starting frequency and/or the ending frequency of the system information area or the network area.

Optionally, the IAS is transmitted at any frequency position or a predefined frequency position in a bandwidth occupied by the system information area or the network area, and the transmitting position for the IAS in a subframe is pre-defined by the system information area or the network area with a user.

In a fourth aspect, it is further provided a device for accessing a system information area or a network area. The device includes: a determination module, used to determine at least one initial access signal (IAS); and a transmitting module, used to transmit the at least one IAS, to enable a terminal having received the IAS to obtain one or more of a subframe boundary, a system bandwidth, a starting frequency and an ending frequency of the system information area or the network area, based on the received IAS.

Optionally, the transmitting module is further used to transmit the IAS, to enable the terminal having received the IAS to obtain the subframe boundary of the system information area or the network area based on a pre-defined transmitting position for the IAS in a subframe; or to enable the terminal having received the IAS to obtain the system bandwidth, the starting frequency and/or the ending frequency of the system information area or the network area based on a pre-defined mapping relationship between the IAS and the system bandwidth; or to enable the terminal having received the IAS to demodulate a signal in addition to the IAS corresponding to the IAS based on a pre-defined time-frequency relationship between the IAS and the signal in addition to the IAS and obtain the system bandwidth, the starting frequency and/or the ending frequency of the system information area or the network area, where the signal in addition to the IAS includes the system bandwidth, the starting frequency and/or the ending frequency of the system information area or the network area.

Optionally, the IAS is transmitted at any frequency position or a predefined frequency position in a bandwidth occupied by the system information area or the network area, and the transmitting position for the IAS in a subframe is pre-defined by the system information area or the network area with a user.

Each of the above described technical solutions has the following advantages or beneficial effects. The system bandwidth and/or the subframe boundary may be obtained through multiple IASs (e.g., the IASs may have functions such as cell synchronization, time domain/frequency domain synchronization and system information reception in cell), which improves flexibility and capacity of system, thereby satisfying requirements of a future multi-antenna system.

DETAILED DESCRIPTION

Exemplary embodiments of the present disclosure are to be detailed with reference to the drawings. It should be understood that, although the exemplary embodiments are illustrated in the drawings, the present disclosure can be achieved in various ways rather than those limited by the embodiments disclosed herein. On the contrary, the embodiments are provided to better understand the present disclosure and to convey the scope of the present disclosure completely to the skilled in the art.

It is known by the skilled in the art the embodiments of the present disclosure may be implemented into a system, a device, an apparatus, a method or a computer program product. Hence, the embodiments of the present disclosure may be implemented in the followings ways: complete hardware, complete software (including firmware, resident software, microcode and so on), or combination of hardware and software.

According to embodiments of the present disclosure, a method and a device for accessing a system information area or a network area are provided. A terminal receives at least one initial access signal (IAS) transmitted by a system information area or a network area. The terminal obtains a subframe boundary of the system information area or the network area based on a preset transmitting position for the IAS in a subframe; or the terminal obtains a system bandwidth, a starting frequency and/or an ending frequency of the system information area or the network area based on a preset mapping relationship between the IAS and the system bandwidth; or the terminal demodulates a signal in addition to the IAS corresponding to the IAS based on a preset time-frequency relationship between the IAS and the signal in addition to the IAS, and obtains the system bandwidth, the starting frequency and/or the ending frequency of the system information area or the network area, where the signal in addition to the IAS includes the system bandwidth, the starting frequency and/or the ending frequency of the system information area or the network area.

In embodiments of the present disclosure, the initial access signal is abbreviated as IAS. It should be noted that, the IAS is a general name representing a set of signal(s) required in a step of accessing a network by a UE, which may include one signal or multiple signals. The IAS may be used to achieve one or more functions such as system information area synchronization or network area synchronization, time domain/frequency domain synchronization, system information reception in system information area or network area. Obviously, it can be understood that the IAS according to embodiments of the present disclosure is not limited to the above exemplary functions and is not limited to include some specific signals.

In embodiments of the present disclosure, the IAS may have a function of providing a time-frequency synchronization signal to a UE. In an LTE system, the time-frequency synchronization signal provided to the UE is referred to as SYNC, including two parts: PSS and SSS. Time-frequency synchronization may realize synchronization in a subframe level (1 ms). Each system information area or network area (or a station) transmits its own PSS/SSS. A base sequence of the PSS/SSS of each system information area or network area has a one-to-one correspondence with an ID of the system information area or network area (such as a cell ID). When the UE detects the PSS/SSS of one system information area or network area, the UE correspondingly obtains the ID of the system information area or network area (such as the cell ID). The UE detects PSSs/SSSs of different system information areas or network areas and then selects the system information area or network area having a strongest intensity to access.

Figure 1:
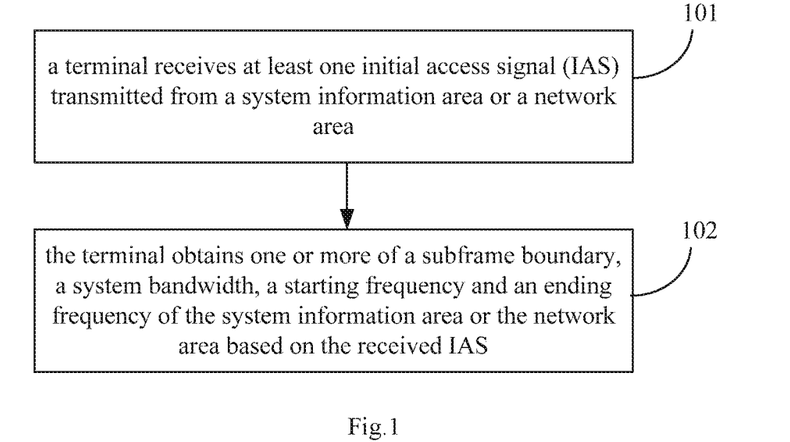
FIG. 1 is a flow chart of a method for accessing a system information area or a network area according to some embodiments of the present disclosure.

Some embodiments provide a method for accessing a system information area or a network area. As shown in FIG. 1, the method includes followings steps 101 and 102.

In step 101, a terminal receives at least one initial access signal (IAS) transmitted from a system information area or a network area.

Optionally, the system information area or the network area is formed by one or more stations and each IAS is transmitted by one of the stations or a group of the stations. In an example, the system information area or the network area is a cell, the station is a base station, and specifically step 101 includes: receiving, by the terminal, the at least one IAS transmitted from the cell in downlink.

The IAS may represent a set of signal(s) required by a UE to access a network, and the IAS may include only one signal or multiple signals. The IAS may be used to achieve one or more functions such as cell synchronization, time domain/frequency domain synchronization, system information reception in cell. It should be noted that in the embodiments of the present disclosure, specific functions of the IAS and specific signals included in the IAS are not limited.

Optionally, in a case that the system information area or the network area transmits one IAS, the IAS is transmitted at any frequency position in a bandwidth occupied by the system information area or the network area, and a transmitting position for the IAS in a subframe is predetermined by the system information area or the network area with a user; alternatively, the IAS is transmitted at a predetermined frequency position in the bandwidth occupied by the system information area or the network area, and the transmitting position for the IAS in the subframe is predetermined by the system information area or the network area with the user.

Optionally, in a case that the system information area or the network area transmits multiple IASs, each IAS of the multiple IASs is transmitted at any frequency position in a bandwidth occupied by the system information area or the network area, and transmitting positions for the multiple IASs in a subframe are predetermined by the system information area or the network area with a user; alternatively, the multiple IASs are transmitted at multiple predetermined frequency positions in the bandwidth occupied by the system information area or the network area, and the transmitting positions for the multiple IASs in the subframe are predetermined by the system information area or the network area with the user.

In the embodiments of the present disclosure, the multiple IASs may be distinguished from each other using any one or combination of time division multiplexing (TDM), frequency domain multiplexing (FDM) and code division multiplexing (CDM), while the approach of distinguishing is not limited thereto.

It should be noted that in the embodiments, different system information areas or network areas may transmit different quantities of IASs within the respective system information areas or network areas, different quantities of IASs may be transmitted within one system information area or network area at different time instants, and the specific quantities of IASs to be transmitted are determined by the system information areas or network areas. A self-implementing algorithm of a network determines the quantity of IASs according to corresponding conditions, for example, the quantity of the IASs may be determined according to the quantity of beams for beamforming in the network and the quantity of IASs to be transmitted may be the same as the quantity of the beams, or the quantity of the IASs may be determined according to the quantity of transmit-receive points (TRPs) in a cell, and each TRP corresponds to one IAS.

In step 102, the terminal obtains one or more of a subframe boundary, a system bandwidth, a starting frequency and an ending frequency of the system information area or the network area based on the received IAS.

Specifically, the terminal obtains the subframe boundary of the system information area or the network area based on the preset transmitting position for the IAS in the subframe; or the terminal obtains the system bandwidth, the starting frequency and/or the ending frequency of the system information area or the network area based on a preset mapping relationship between the IAS and the system bandwidth; or the terminal demodulates a signal in addition to the IAS corresponding to the IAS based on a preset time-frequency relationship between the IAS and the signal in addition to the IAS and obtains the system bandwidth, the starting frequency and/or the ending frequency of the system information area or the network area, where the signal in addition to the IAS includes the system bandwidth, the starting frequency and/or the ending frequency of the system information area or the network area.

Figure 4:
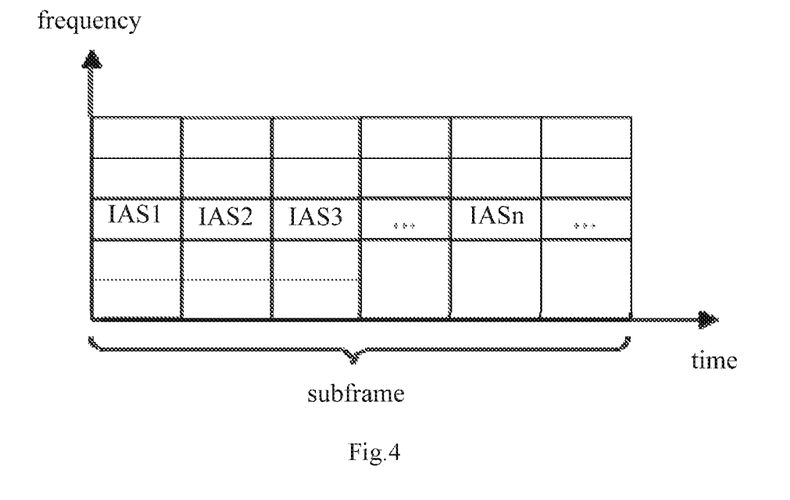
FIG. 4 schematically illustrates transmitting multiple IASs in a TDM way according to some embodiments of the present disclosure.

In one example, the user receives one or multiple IASs in downlink. In case of detecting a certain IAS, a serial number of the IAS is determined based on a sequence associated with the IAS, and then the subframe boundary is determined based on the preset transmitting position for the IAS in the subframe. For example, the system presets that n IASs are transmitted at time instants as shown in FIG. 4. In a case that the user detects the third one of the n IASs, the subframe boundary is located at a place of two symbols in front of the third IAS.

In another example, the system predefines a mapping relationship between an IAS sequence and the system bandwidth, the starting frequency and the ending frequency, and the terminal obtains the system bandwidth, the starting frequency and/or the ending frequency of the system information area or the network area based on the mapping relationships.

In further another example, the terminal obtains the system bandwidth, the starting frequency and/or the ending frequency of the system information area or the network area by detecting a system signal in addition to the IAS. The system signal may be System Information and may include the system bandwidth, the starting frequency and the ending frequency of a cell.

Subsequently, the terminal may proceed to an accessing procedure based on one or any combination of the subframe boundary, the system bandwidth, the starting frequency and the ending frequency of the system information area or the network area, while the subsequent accessing procedure is known in relevant technology and is not repeated herein.

Figure 2:
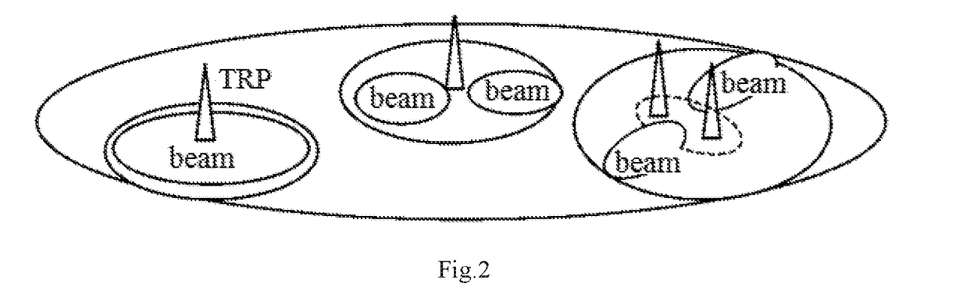
FIG. 2 is a schematic diagram of a communication system.

FIG. 2 schematically illustrates a system which may be applied to a first embodiment. The following embodiment is described by taking a cell for example. The concept of the cell may be replaced with the system information area, the network area or the like. Coverage of one wireless network provides a wide area coverage. The wireless network covers multiple cells, and each cell covers a range different from any other cell. One cell is defined as one wireless network object which may be used to access a network. Each cell corresponds to a unique cell ID that is broadcast within the each cell. One cell may include one or multiple transmit of receive points (TRPs). Each TRP includes N antenna(s), where N is equal to or greater than 1. The antenna of the TRP may perform beamforming, and a downlink signal may be transmitted on the antenna after being beamformed. Whether each beam provides a wide coverage or a narrow coverage is determined based on the quantity of the antenna (s) and a beamforming manner.

In the embodiments of the present disclosure, by executing step 101 and step 102, the system bandwidth and/or the subframe boundary may be obtained using multiple IASs (e.g., the IASs may have functions such as cell synchronization, time domain/frequency domain synchronization and system information reception in cell), flexibility and capacity of system accessing are enhanced, thereby satisfying requirements of future multi-antenna systems.

Figure 3:
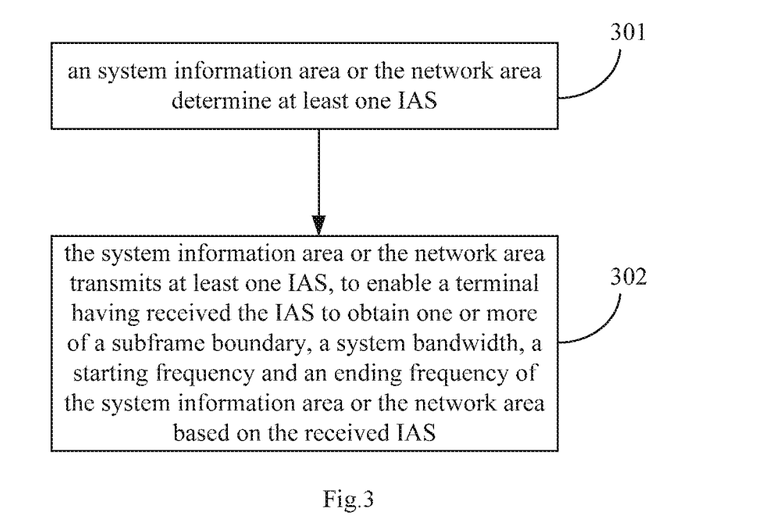
FIG. 3 is a flow chart of a method for accessing a system information area or a network area according to some embodiments of the present disclosure.

In some embodiments, an executing body of a method for accessing a system information area or a network area may be a device in the system information area or the network area. As shown in FIG. 3, the method includes steps 301 and 302.

In step 301, the system information area or the network area determines at least one IAS and then the method proceeds to step 302.

Optionally, the system information area or the network area is formed by one or more stations. Each IAS is transmitted by one station or a group of stations. The system information area of the network area may exemplarily be a cell, and the station may exemplarily be a base station. Specifically, in step 101, a terminal receives one or more IASs transmitted from the cell in downlink.

The IAS may represent a set of signal(s) required by a UE to access a network, and the IAS may include only one signal or multiple signals. The IAS may be used to achieve one or more functions such as cell synchronization, time domain/frequency domain synchronization, system information reception in cell. It should be noted that in the embodiments of the present disclosure, specific functions of the IAS and specific signals included in the IAS are not limited.

In some embodiments, optionally, in a case that the system information area or the network area transmits one IAS, the IAS is transmitted at any frequency position in a bandwidth occupied by the system information area or the network area, and a transmitting position for the IAS in a subframe is predetermined by the system information area or the network area with a user; alternatively, the IAS is transmitted at a predetermined frequency position in the bandwidth occupied by the system information area or the network area and the transmitting position for the IAS in the subframe is predetermined by the system information area or the network area with the user.

In some embodiments, optionally, in a case that the system information area or the network area transmits multiple IASs, each IAS of the multiple IASs is transmitted at any frequency position in a bandwidth occupied by the system information area or the network area and transmitting positions for the multiple IASs in a subframe are predetermined by the system information area or the network area with a user; alternatively, the multiple IASs are transmitted at multiple predetermined frequency positions in the bandwidth occupied by the system information area or the network area, and the transmitting positions for the multiple IASs in the subframe are predetermined by the system information area or the network area with the user.

Furthermore, the multiple IASs may be distinguished from each other using any one or combination of TDM, FDM and CDM.

In step 302, the system information area or the network area transmits at least one IAS, to enable a terminal having received the IAS to obtain one or more of a subframe boundary, a system bandwidth, a starting frequency and an ending frequency of the system information area or the network area based on the received IAS.

Specifically, the system information area or the network area transmits the at least one IAS, to enable the terminal having received the IAS to obtain the subframe boundary of the system information area or the network area based on the preset transmitting position for the IAS in the subframe; or to enable the terminal having received the IAS to obtain the system bandwidth, the starting frequency and/or the ending frequency of the system information area or the network area based on a preset mapping relationship between the IAS and the system bandwidth; or to enable the terminal having received the IAS to demodulate a signal in addition to the IAS corresponding to the IAS based on a preset time-frequency relationship between the IAS and the signal in addition to the IAS and obtain the system bandwidth, the starting frequency and/or the ending frequency of the system information area or the network area, where the signal in addition to the IAS includes the system bandwidth, the starting frequency and/or the ending frequency of the system information area or the network area.

In the embodiments of the present disclosure, by executing step 301 and step 302, the system bandwidth and/or the subframe boundary may be obtained through multiple IASs (e.g., the IASs may have functions such as cell synchronization, time domain/frequency domain synchronization and system information reception in cell), flexibility and capacity of system accessing are enhanced, thereby satisfying requirements of a future multi-antenna system.

A following embodiment is described by taking a cell for example. The concept of the cell may be replaced with the system information area, the network area or the like, which does not affect the implementing of the embodiment.

In the embodiment, a process of obtaining the system bandwidth and determining the subframe boundary is described as follows.

In step A, a cell transmits multiple IASs in downlink. Different signals are transmitted at different time instants in a TDM mode. The different signals use different basic sequences, or the different signals use an identical basic sequence and use different scramble code sequences for scrambling. In the following, it is suggested that the different signals use different scramble code sequences. Furthermore, the different signals are transmitted at a same frequency position in a bandwidth of the cell.

In step B, a user receives, in downlink, one or more IASs. In case of detecting a certain IAS, a serial number of the IAS is determined based on a sequence associated with the IAS, and then the subframe boundary is determined based on the preset transmitting position for the IAS in the subframe. For example, the system presets that n IASs are transmitted at time instants as shown in FIG. 4. In a case that the user detects the third one of the n IASs, the subframe boundary is located at two symbols prior to the third IAS.

In step C, the user determines whether to access the cell according to a predefined cell accessing rule. For one cell accessing rule, in a case that the user successfully finds a certain IAS, and an intensity of the IAS is sufficient to satisfy performance requirements for accessing the cell, the cell is successfully accessed.

In step D, if the user successfully accesses the cell, the user needs to obtain a cell bandwidth, the starting frequency and the ending frequency.

Specifically, in one approach, the system predefines a mapping relationship between an IAS sequence and the system bandwidth, the starting frequency and the ending frequency. The user searches the mapping relationship based on a characteristic of an IAS detected when accessing the cell, to obtain information about the system bandwidth, the starting frequency and the ending frequency. For example, a mapping relationship between a basic sequence and the system bandwidth, the starting frequency and the ending frequency is predetermined as reflected in chart 1. If a base sequence of a detected IAS is Base sequence 2, the starting frequency of the system is f2,1, the ending frequency of the system is f2,2, and the system bandwidth is f2,2-f1,1.

Chart 1: mapping relationship between IAS and system bandwidth

| Base sequence | starting frequency and ending frequency |
| --- | --- |
| Base sequence 1 | [f1, 1, f1, 2] |
| Base sequence 2 | [f2, 1, f2, 2] |
| . . . | . . . |
| Base sequence M | [fM, 1, fM, 2] |

Optionally, another mapping relationship is reflected in Chart 2, where f0 represents a frequency point where a center of the base sequence is located, fd represents a basic unit of the bandwidth (a basic bandwidth), m1,1 represents that a system starting frequency corresponding to Base sequence 1 is away from f0 by m1,1 basic bandwidth, m1,2 represents that a system ending frequency corresponding to Base sequence 1 is away from f0 by m1,2 basic bandwidth. The system bandwidth is (m1,1+m1,2)fd. Cases of other basic sequences may be deduced from the above case of Base sequence 1. Hence, a mapping relationship between Base sequence and a value of m is equivalently predefined.

Chart 2: mapping relationship between IAS and system bandwidth

| Base sequence | starting frequency and ending frequency |
| --- | --- |
| Base sequence 1 | [f0 − m1, 1fd, f0 + m1, 2fd] |
| Base sequence 2 | [f0 − m2, 1fd, f0 + m2, 2fd] |
| . . . | . . . |
| Base sequence M | [f0−mM,1fd, f0+mM,2fd] |

Figure 5:
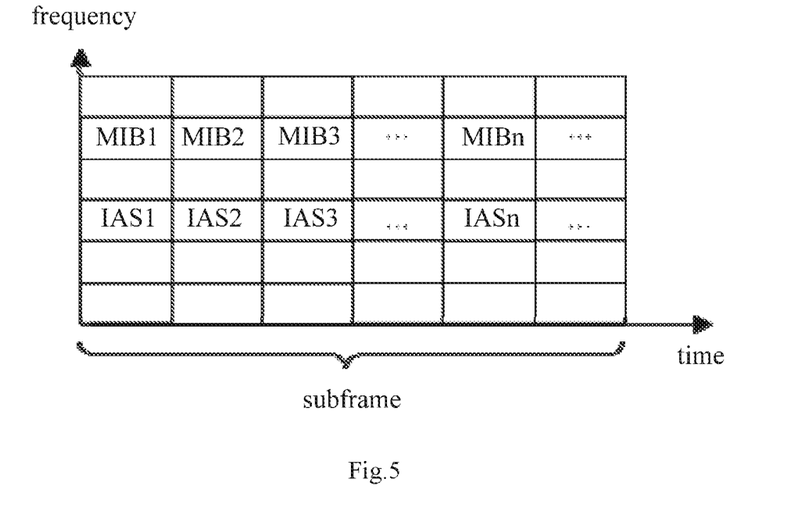
FIG. 5 schematically illustrates a relationship between IASs and system signals according to some embodiments of the present disclosure.

In another approach, the user detects a system signal in addition to the IAS. The system signal may be System Information. The system signal may include information about the system bandwidth, the starting frequency and the ending frequency of the cell. The system predefines a time-frequency relationship between the system signal and the IAS. FIG. 5 illustrates a predefined time-frequency corresponding relationship between the system signal (denoted as MIB) and the IAS. MIB1, MIB2, . . . , MIBn in FIG.

5 may be all the same. The user finds the corresponding MIB based on a detected IAS and obtains system bandwidth information.

A following embodiment is described by taking a cell for example. The concept of the cell may be replaced with the system information area, the network area or the like, which does not affect the implementing of the embodiment.

In the embodiment, a process of obtaining the system bandwidth and determining the subframe boundary is described as follows.

In step A, a cell transmits multiple IASs in downlink. Different signals are transmitted at an identical time instant in a FDM mode. The different signals may use an identical sequence. Furthermore, the different signals are transmitted at any different frequency positions in a bandwidth of the cell.

Figure 6:
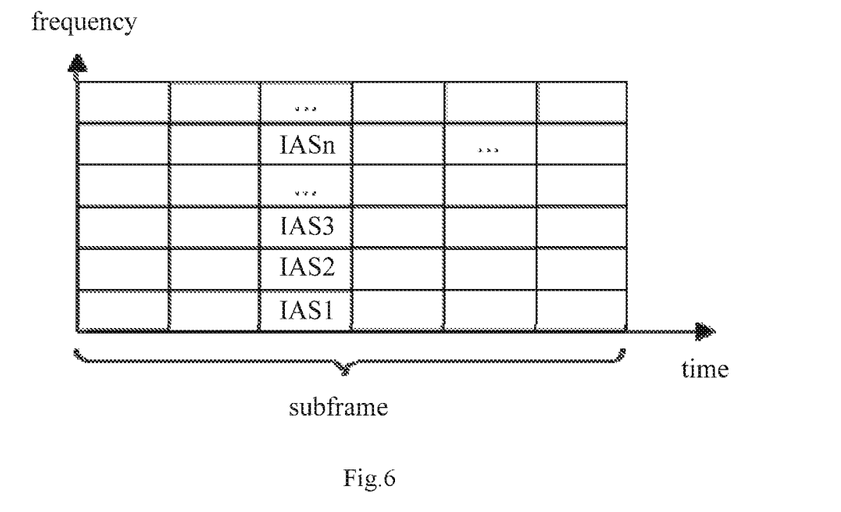
FIG. 6 schematically illustrates transmitting multiple IASs in an FDM way according to some embodiments of the present disclosure.

In step B, a user receives, in downlink, one or more IASs. In case of detecting a certain IAS, the subframe boundary is determined based on a preset transmitting position for the IAS in a subframe. For example, the system defines that n IASs are transmitted at a time instant as shown in FIG. 6. In a case that the user detects a certain IAS, the subframe boundary is located at two symbols in front of the certain IAS.

In step C, the user determines whether to access the cell according to a predefined cell accessing rule. For one cell accessing rule, in a case that the user successfully finds a certain IAS, and an intensity of the IAS is sufficient to satisfy performance requirements for accessing the cell, the cell is successfully accessed.

In step D, if the user successfully accesses the cell, the user needs to obtain a bandwidth, the starting frequency and the ending frequency of the cell.

Specifically, in one approach, the system predefines a mapping relationship between an IAS sequence and the system bandwidth, the starting frequency and the ending frequency. The user searches the mapping relationship based on a characteristic of an IAS detected when accessing the cell to obtain information about the system bandwidth, the starting frequency and the ending frequency. For example, a mapping relationship between a sequence and the system bandwidth, the starting frequency and the ending frequency is predetermined as reflected in chart 3. If a sequence of a detected IAS is Sequence 2, the starting frequency of the system is f2,1, the ending frequency of the system is f2,2 and the system bandwidth is f2,2-f1,1.

Chart 3: mapping relationship between IAS and system bandwidth

| Sequence | starting frequency and ending frequency |
| --- | --- |
| Sequence 1 | [f1, 1, f1, 2] |
| Sequence 2 | [f2, 1, f2, 2] |
| . . . | . . . |
| Sequence M | [fM, 1, fM, 2] |

Figure 7:
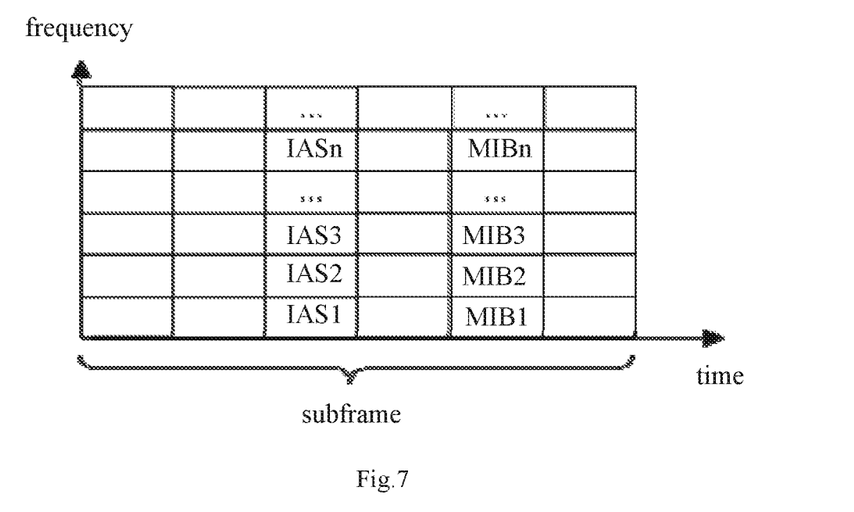
FIG. 7 schematically illustrates a relationship between IASs and system signals according to some embodiments of the present disclosure.

In another approach, the user detects a system signal in addition to the IAS. The system signal may be System Information. The system signal may include information about the system bandwidth, the starting frequency and the ending frequency of the cell. The system predefines a time-frequency relationship between the system signal and the IAS. FIG. 7 illustrates a predefined time-frequency corresponding relationship between the system signal (denoted as MIB) and the IAS. MIB1, MIB2, . . . , MIBn in FIG. 7 may be all the same. The user demodulates the corresponding MIB at a same frequency position as the second signal after the detected IAS to obtain system bandwidth information.

A following embodiment is described by taking a cell for example. The concept of the cell may be replaced with the system information area, the network area or the like, which does not affect the implementing of the embodiment.

In the embodiment, a process of obtaining the system bandwidth and determining the subframe boundary is described as follows.

In step A, a cell transmits multiple IASs in downlink. Different signals are transmitted at a same time instant using a FDM way, or the different signals may use a same basic sequence and use different scramble code sequences for scrambling. Furthermore, the different signals are transmitted on multiple predetermined frequency positions in a bandwidth of the cell.

Figure 8:
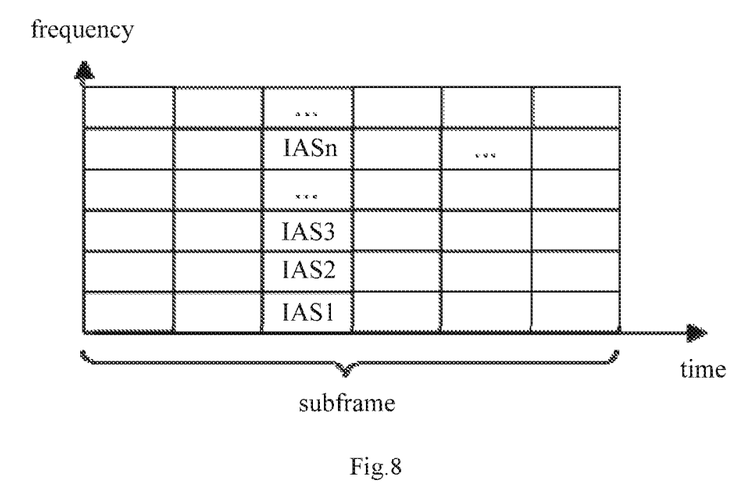
FIG. 8 schematically illustrates transmitting multiple IASs in an FDM way according to some embodiments of the present disclosure.

In step B, a user receives, in downlink, one or multiple IASs. In case of detecting a certain IAS, the subframe boundary is determined based on a preset transmitting position for the IAS in a subframe. For example, the system defines that n IASs are transmitted at a time instant as shown in FIG. 8. In a case that the user detects a certain one from the n IASs, the subframe boundary is located at two symbols prior to the certain IAS.

In step C, the user determines whether to access the cell according to a predefined cell accessing rule. For one cell accessing rule, in a case that the user successfully finds a certain IAS, and an intensity of the IAS is sufficient to satisfy performance requirements for accessing the cell, the cell is successfully accessed.

In step D, if the user successfully accesses the cell, the user needs to obtain a bandwidth, the starting frequency and the ending frequency of the cell.

Specifically, in one approach, the system predefines a mapping relationship between an IAS sequence and the system bandwidth, the starting frequency and the ending frequency. The mapping relationship defines a relationship between a frequency position of an Nth IAS in frequency domain and a cell bandwidth. In a mapping relationship as shown in Chart 4, f0 represents a frequency point where a center of a base sequence of the Nth IAS is located. Assuming that N is equal to 1, the user determines, based on a scramble code sequence of an IAS detected when accessing the cell, a serial number of the detected IAS in frequency domain; then, a frequency position where a first IAS is located is deduced according to a predetermined frequency position. For example, it is predetermined that a center frequency point of the first IAS is f0, a center frequency point of a second IAS is f0+Δf, a center frequency point of a third IAS is f0+2Δf, and so on. Here Δ f represents a frequency interval between adjacent IASs. Therefore, the center frequency point of the first IAS may be obtained based on the IAS detected when accessing the cell. Finally, the cell bandwidth, the starting frequency and the ending frequency are determined based on Chart 4.

Chart 4: mapping relationship between IAS and system bandwidth

| Base sequence | starting frequency and ending frequency |
| --- | --- |
| Base sequence 1 | [f0 − m1, 1fd, f0 + m1, 2fd] |
| Base sequence 2 | [f0 − m2, 1fd, f0 + m2, 2fd] |
| . . . | . . . |
| Base sequence M | [f0 − mM, 1fd, f0 + mM, 2fd] |

Figure 9:
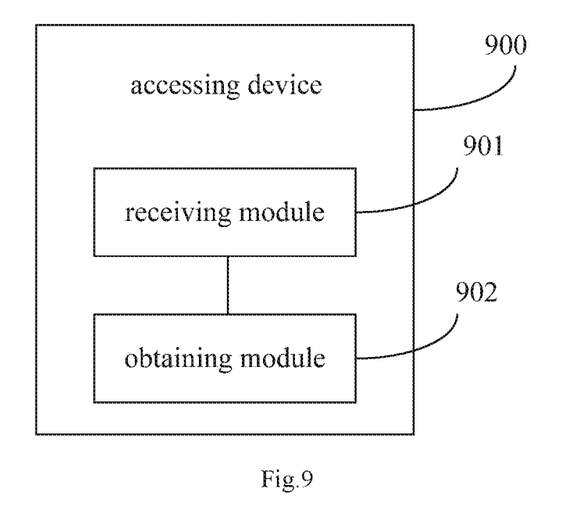
FIG. 9 is a block diagram of a device for accessing a system information area or a network area according to some embodiments of the present disclosure.

Some embodiments provide a device for accessing a system information area or a network area. As shown in FIG. 9, the device 900 includes: a receiving module 901 configured to receive at least one initial access signal (IAS) transmitted from the system information area or the network area, and an obtaining module 902 configured to obtain one or more of a subframe boundary, a system bandwidth, a starting frequency and an ending frequency of the system information area or the network area based on the received IAS.

Optionally, the obtaining module 902 is specifically configured to obtain the subframe boundary of the system information area or the network area based on a preset transmitting position for the IAS in a subframe; or obtain the system bandwidth, the starting frequency and/or the ending frequency of the system information area or the network area based on a preset mapping relationship between the IAS and the system bandwidth; or demodulate a signal in addition to the IAS corresponding to the IAS based on a preset time-frequency relationship between the IAS and the signal in addition to the IAS and obtain the system bandwidth, the starting frequency and/or the ending frequency of the system information area or the network area, where the signal in addition to the IAS includes the system bandwidth, the starting frequency and/or the ending frequency of the system information area or the network area.

In one example, the user receives one or multiple IASs in downlink. In case of detecting a certain IAS, a serial number of the IAS is determined based on a sequence associated with the IAS, and then the subframe boundary is determined based on the preset transmitting position for the IAS in the subframe. For example, the system presets that n IASs are transmitted at time instants as shown in FIG. 4. In a case that the user detects the third one of the n IASs, the subframe boundary is located at two symbols prior to the third IAS.

In another example, the system predefines a mapping relationship between an IAS sequence and the system bandwidth, the starting frequency and the ending frequency, and the terminal obtains the system bandwidth, the starting frequency and/or the ending frequency of the system information area or the network area based on the mapping relationship.

In further another example, the terminal obtains the system bandwidth, the starting frequency and/or the ending frequency of the system information area or the network area by detecting a system signal in addition to the IAS. The system signal may be System Information and may include the system bandwidth, the starting frequency and the ending frequency of a cell.

Optionally, in a case that the system information area or the network area transmits one IAS, the IAS is transmitted at any frequency position in a bandwidth occupied by the system information area or the network area and a transmitting position for the IAS in a subframe is predetermined by the system information area or the network area with a user; alternatively, the IAS is transmitted at a predetermined frequency position in the bandwidth occupied by the system information area or the network area and the transmitting position for the IAS in the subframe is predetermined by the system information area or the network area with the user.

Optionally, in a case that the system information area or the network area transmits multiple IASs, each IAS of the multiple IASs is transmitted at any frequency position in a bandwidth occupied by the system information area or the network area and transmitting positions for the multiple IASs in a subframe are predetermined by the system information area or the network area with a user; alternatively, the multiple IASs are transmitted at multiple predetermined frequency positions in the bandwidth occupied by the system information area or the network area, and the transmitting positions for the multiple IASs in the subframe are predetermined by the system information area or the network area with the user.

Optionally, the multiple IASs may be distinguished from each other using any one or combination of TDM, FDM and CDM.

Optionally, the system information area or the network area is formed by one or multiple stations, and each IAS is transmitted by one station or a group of stations.

In the embodiments, the system bandwidth and/or the subframe boundary may be obtained through multiple IASs (e.g., the IASs may have functions such as cell synchronization, time domain/frequency domain synchronization and system information reception in cell), which improves flexibility and capacity of system accessing, thereby satisfying requirements of a future multi-antenna system.

Figure 10:
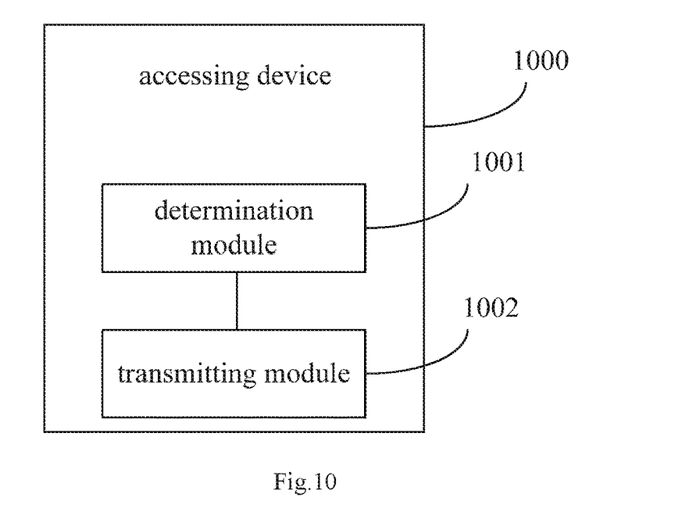
FIG. 10 is a block diagram of a device for accessing a system information area or a network area according to some embodiments of the present disclosure.

Some embodiments provide a device for accessing a system information area or a network area. As shown in FIG. 10, the device 1000 includes: a determination module 1001, configured to determine oat least one IAS; and a transmitting module 1002, configured to transmit the at least one IAS, to enable a terminal having received the IAS to obtain one or more of a subframe boundary, a system bandwidth, a starting frequency and an ending frequency of the system information area or the network area based on the received IAS.

The transmitting module 1002 is specifically configured to transmit the at least one IAS, to enable the terminal having received the IAS to obtain the subframe boundary of the system information area or the network area based on the preset transmitting position for the IAS in the subframe; or to enable the terminal having received the IAS to obtain the system bandwidth, the starting frequency and/or the ending frequency of the system information area or the network area based on a preset mapping relationship between the IAS and the system bandwidth; or to enable the terminal having received the IAS to demodulate a signal in addition to the IAS corresponding to the IAS based on a preset time-frequency relationship between the IAS and the signal in addition to the IAS and obtain the system bandwidth, the starting frequency and/or the ending frequency of the system information area or the network area, where the signal in addition to the IAS includes the system bandwidth, the starting frequency and/or the ending frequency of the system information area or the network area.

In one example, the user receives one or more IASs in downlink. In case of detecting a certain IAS, a serial number of the IAS is determined based on a sequence associated with the IAS, and then the subframe boundary is determined based on a preset transmitting position for the IAS in a subframe. For example, the system presets that n IASs are transmitted at time instants as shown in FIG. 4. In a case that the user detects the third one of the n IASs, the subframe boundary is located at two symbols prior to the third IAS.

In another example, the system predefines a mapping relationship between an IAS sequence and the system bandwidth, the starting frequency and the ending frequency, and the terminal obtains the system bandwidth, the starting frequency and/or the ending frequency of the system information area or the network area based on the mapping relationship.

In further another example, the terminal obtains the system bandwidth, the starting frequency and/or the ending frequency of the system information area or the network area by detecting a system signal in addition to the IAS. The system signal may be system information and may include the system bandwidth, the starting frequency and the ending frequency of a cell.

Optionally, in a case that the system information area or the network area transmits one IAS, the IAS is transmitted at any frequency position in a bandwidth occupied by the system information area or the network area, and a transmitting position for the IAS in a subframe is pre-defined by the system information area or the network area with a user; alternatively, the IAS is transmitted at a predetermined frequency position in the bandwidth occupied by the system information area or the network area, and the transmitting position for the IAS in the subframe is pre-defined by the system information area or the network area with the user.

Optionally, in a case that the system information area or the network area transmits multiple IASs, each of the multiple IASs is transmitted at any frequency position in a bandwidth occupied by the system information area or the network area, and transmitting positions for the multiple IASs in a subframe are pre-defined by the system information area or the network area with a user; alternatively, the multiple IASs are transmitted at multiple predetermined frequency positions in the bandwidth occupied by the system information area or the network area, and the transmitting positions for the multiple IASs in the subframe are pre-defined by the system information area or the network area with the user.

Optionally, the multiple IASs may be distinguished from each other using any one or combination of TDM, FDM and CDM.

Optionally, the system information area or the network area is formed by one or multiple stations, and each IAS is transmitted by one station or a group of stations.

In the embodiments, the system bandwidth and/or the subframe boundary may be obtained through multiple IASs (e.g., the IASs may have functions such as cell synchronization, time domain/frequency domain synchronization and system information reception in cell), and flexibility and capacity of system accessing are enhanced, thereby satisfying requirements of a future multi-antenna system.

Figure 11:
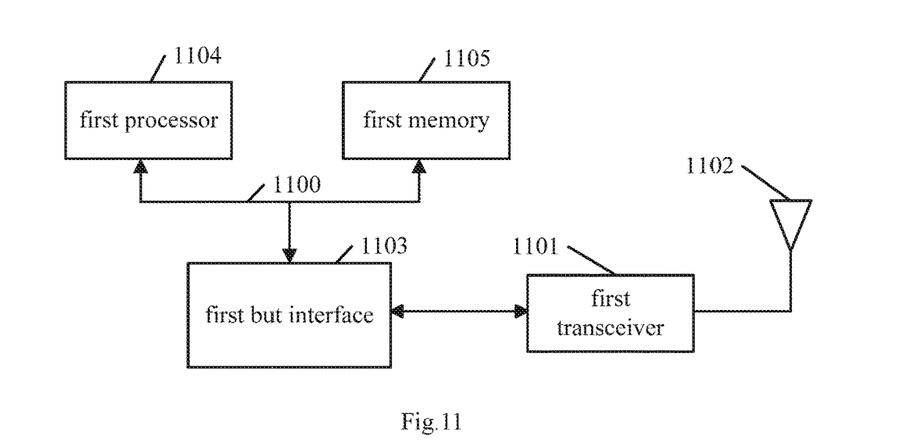
FIG. 11 is a block diagram of a device for accessing a system information area or a network area according to some embodiments of the present disclosure.

Some embodiments provide a device for accessing a system information area or a network area. As shown in FIG. 11, the device includes: a first processor 1104, configured to read a program in a first memory 1105 to perform following processes: receiving at least one initial access signal (IAS) transmitted from the system information area or the network area, and obtaining one or more of a subframe boundary, a system bandwidth, a starting frequency and an ending frequency of the system information area or the network area based on the received IAS. The device further includes a first transceiver 1101, configured to receive and transmit data under control of the first processor 1104.

In FIG. 1*l*, a bus architecture, denoted as a first bus 1100, may include an arbitrary quantity of buses and bridges connected to each other. Various circuits of one or more processors represented by the first processor 1104 are coupled to various circuits of a memory represented by the first memory 1105 via the first bus 1100. The first bus 1100 may further couple other circuits together, such as a periphery component, a voltage stabilizer and a power management circuit, which is well known in the art and is therefore not repeated herein. A first bus interface 1103 provides an interface between the first bus 1100 and the first transceiver 1101. The first transceiver 1101 may consist of one element, or multiple elements, for example, including multiple receivers and multiple transmitters. The first transceiver 1101 provides a unit configured to communicate with other devices on a transmission medium. Data processed by the first processor 1104 is transmitted on a wireless medium via an antenna 1102. Furthermore, the antenna 1102 receives data and transmits the received data to the first processor 1104.

The first processor 1104 is in charge of managing the first bus 1100 and common processes, and may further provide various functions, e.g., timing, periphery interfaces, voltage adjusting, power source management and other controlling functions. The first memory 1105 may be configured to store data to be used by the first processor 1104 when performing the above-described processes.

Optionally, the first processor 1104 may be a CPU, an ASIC, an FPGA or a CPLD.

Optionally, the first processor 1104 is configured to obtain the subframe boundary of the system information area or the network area based on a preset transmitting position for the IAS in a subframe; or obtain the system bandwidth, the starting frequency and/or the ending frequency of the system information area or the network area based on a preset mapping relationship between the IAS and the system bandwidth; or demodulate a signal in addition to the IAS corresponding to the IAS based on a preset time-frequency relationship between the IAS and the signal in addition to the IAS and obtain the system bandwidth, the starting frequency and/or the ending frequency of the system information area or the network area, where the signal in addition to the IAS includes the system bandwidth, the starting frequency and/or the ending frequency of the system information area or the network area.

Optionally, in a case that the system information area or the network area transmits one IAS, the IAS is transmitted at any frequency position in a bandwidth occupied by the system information area or the network area and a transmitting position for the IAS in a subframe is predetermined by the system information area or the network area with a user; alternatively, the IAS is transmitted is transmitted at a predetermined frequency position in the bandwidth occupied by the system information area or the network area and the transmitting position for the IAS in the subframe is predetermined by the system information area or the network area with the user.

Optionally, in a case that the system information area or the network area transmits multiple IASs, each IAS of the multiple IASs is transmitted at any frequency position in a bandwidth occupied by the system information area or the network area and transmitting positions for the multiple IASs in a subframe are predetermined by the system information area or the network area with a user; alternatively, the multiple IASs are transmitted at multiple predetermined frequency positions in the bandwidth occupied by the system information area or the network area and the transmitting positions for the multiple IASs in the subframe are predetermined by the system information area or the network area with the user.

Optionally, the multiple IASs may be distinguished from each other using any one or combination of TDM, FDM and CDM.

Optionally, the system information area or the network area is formed by one or multiple stations, and each IAS is transmitted by one station or a group of stations.

Figure 12:
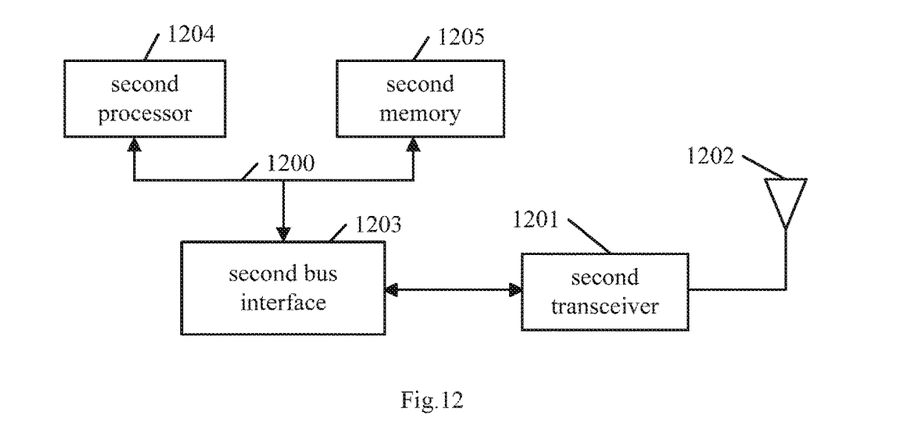
FIG. 12 is a block diagram of a device for accessing a system information area or a network area according to some embodiments of the present disclosure.

Some embodiments provide a device for accessing a system information area or a network area. As shown in FIG. 12, the device includes: a second processor 1204, configured to read a program in a second memory 1205 to perform following processes: determining at least one IAS; and transmitting the at least one IAS, to enable a terminal having received the IAS to obtain one or more of a subframe boundary, a system bandwidth, a starting frequency and an ending frequency of the system information area or the network area based on the received IAS. The device further includes a second transceiver 1201, configured to receive and transmit data under control of the second processor 1204.

In FIG. 12, a bus architecture, denoted as a second bus 1200, may include an arbitrary quantity of buses and bridges connected to each other. Various circuits of one or more processors represented by the second processor 11204 are coupled to various circuits of a memory represented by the second memory 1205 via the second bus 1200. The second bus 1200 may further couple other circuits together, such as a periphery component, a voltage stabilizer and a power management circuit, which is well known in the art and is therefore not repeated herein. A second bus interface 1203 provides an interface between the second bus 1200 and the second transceiver 1201. The second transceiver 1201 may consist of one element, or multiple elements, for example, including multiple receivers and multiple transmitters. The second transceiver 1201 provides a unit configured to communicate with other devices on a transmission medium. Data processed by the second processor 1204 is transmitted on a wireless medium via an antenna 1202. Furthermore, the antenna 1202 receives data and transmits the received data to the second processor 1204.

The second processor 1204 is in charge of managing the second bus 1200 and common processes, and may further provide various functions, e.g., timing, periphery interfaces, voltage adjusting, power source management and other controlling functions. The second memory 1205 may be configured to store data to be used by the second processor 1204 when performing the above-described processes.

Optionally, the second processor 1204 may be a CPU, an ASIC, an FPGA or a CPLD.

Optionally, the second processor 1204 transmit the at least one IAS, to enable the terminal having received the IAS to obtain the subframe boundary of the system information area or the network area based on the preset transmitting position for the IAS in the subframe; or to enable the terminal having received the IAS to obtain the system bandwidth, the starting frequency and/or the ending frequency of the system information area or the network area based on a preset mapping relationship between the IAS and the system bandwidth; or to enable the terminal having received the IAS to demodulate a signal in addition to the IAS corresponding to the IAS based on a preset time-frequency relationship between the IAS and the signal in addition to the IAS and obtain the system bandwidth, the starting frequency and/or the ending frequency of the system information area or the network area, where the signal in addition to the IAS includes the system bandwidth, the starting frequency and/or the ending frequency of the system information area or the network area.

Optionally, in a case that the system information area or the network area transmits one IAS, the IAS is transmitted at any frequency position in a bandwidth occupied by the system information area or the network area and a transmitting position for the IAS in a subframe is pre-defined by the system information area or the network area with a user; alternatively, the IAS is transmitted is transmitted at a pre-defined frequency position in the bandwidth occupied by the system information area or the network area and the transmitting position for the IAS in the subframe is pre-defined by the system information area or the network area with the user.

Optionally, in a case that the system information area or the network area transmits multiple IASs, each IAS of the multiple IASs is transmitted at any frequency position in a bandwidth occupied by the system information area or the network area and transmitting positions for the multiple IASs in a subframe are pre-defined by the system information area or the network area with a user; alternatively, the multiple IASs are transmitted at multiple pre-defined frequency positions in the bandwidth occupied by the system information area or the network area and the transmitting positions for the multiple IASs in the subframe are pre-defined by the system information area or the network area with the user.

Optionally, the multiple IASs may be distinguished from each other using any one or combination of TDM, FDM and CDM. Optionally, the system information area or the network area is formed by one or multiple stations and each IAS is transmitted by one station or a group of stations.

It should be understood that "an embodiment" mentioned throughout the specification means that specific features, structures or characteristics associated with the embodiment is included in at least one embodiment of the present disclosure. Hence, terms of "according to an embodiment" here and there in the specification are not limited to the same embodiment. In addition, those specific features, structures or characteristics can be combined into one or multiple embodiments in any appropriate manner.

It should be understood that, numerical references for respective processes in the embodiments of the present disclosure do not refer to a sequence of executing and these numerical references may not limit the present disclosure. The sequence of executing is determined based on functions of the processes and an internal logic.

In addition, terms of "system" and "network" in the specification may be interchanged.

It should be understood that, the term "and/or" merely describes a relationship between associated objects. Such term may indicate three situations. For example, A and/or B may indicate: mere A, both A and B, or mere B. Furthermore, the symbol "/" usually indicates an "or" relationship between associated objects before and after such symbol.

It should be understood that in the embodiments of the present disclosure, "A corresponding to B" indicates that B is associated with A and B may be determined based on A. However, determining B based on A does not mean determining B based on only A. In fact, B may be determined based on A and/or other information.

It should be understood that the method and device provided in the embodiments of the present disclosure may be realized in other ways. For example, the described embodiments directed to the device are merely exemplary. Taking the division of units for example, the units are merely divided based on logic functions; they may be divided in other ways actually, e.g., multiple units or components may be combined or may be integrated into another system, some features may be neglected, or some functions may not be performed. In addition, the shown or discussed coupling, direct coupling or communication connections may be indirect coupling or indirect communication connections via some interfaces, devices or units. The coupling may be in an electrical manner, a mechanical manner or other manners.

Furthermore, the respective functional units in the embodiments of the present disclosure may be integrated into one processing unit, or may be physically independent, or two or more units are integrated into one unit. The integrated units may be implemented by hardware or by combination of hardware and software.

Integrated units implemented as software functional units may be stored on a computer readable storage medium. The software functional units are stored on a storage medium and include several instructions for enabling a computer device (which may be a personal computer, a server, a network apparatus or the like) to execute partial steps of transceiving methods according to embodiments of the present disclosure. The storage medium may include: a U disk, a mobile Hard Disk, a Read-Only Memory (ROM), a Random Access Memory (RAM), a magnetic disk, an optical disk or various media that can store program codes.

Preferred embodiments are described hereinabove. It should be noted that various improvements and polishments can be made by the ordinary skilled in the art without departing from the principle of the present disclosure. Those improvements and polishments fall all within the protection scope of the present disclosure.

What is claimed is:

1. A method for accessing a system information area or a network area, comprising:
   receiving, by a terminal, a plurality of initial access signals (IAS) transmitted from the system information area or the network area; and
   obtaining, by the terminal, one or more of a subframe boundary, a system bandwidth, a starting frequency and an ending frequency of the system information area or the network area based on the received IAS, wherein
   each IAS of the plurality of IASs comprises a synchronization signal, and the synchronization signal comprised in each IAS of the plurality of IASs comprises a primary synchronization signal (PSS) and a secondary synchronization signal (SSS);
   IASs transmitted at an identical time instant among the plurality of IASs are transmitted at any different frequency positions in a bandwidth of one downlink band occupied by the system information area or the network area, and
   IASs transmitted at different time instants among the plurality of IASs are transmitted with beams having different directions;
   each transmitting position for the plurality of IASs in a subframe is pre-defined by the system information area or the network area with the terminal.

2. The method according to claim 1, wherein the obtaining, by the terminal, one or more of the subframe boundary, the system bandwidth, the starting frequency and the ending frequency of the system information area or the network area based on the received IAS comprises:
   obtaining, by the terminal, the subframe boundary of the system information area or the network area based on a pre-defined transmitting position for the IAS in a subframe.

3. The method according to claim 1, wherein the plurality of IASs are distinguished from each other using any one or combination of time division multiplexing, frequency domain multiplexing and code division multiplexing.

4. The method according to claim 1, wherein the system information area or the network area is formed by one or more stations and each of the plurality of IASs is transmitted by one of the stations or a group of the stations.

5. The method according to claim 1, wherein the obtaining, by the terminal, one or more of the subframe boundary, the system bandwidth, the starting frequency and the ending frequency of the system information area or the network area based on the received IAS comprises:
   obtaining, by the terminal, the system bandwidth, the starting frequency and/or the ending frequency of the system information area or the network area based on a pre-defined mapping relationship between the IAS and the system bandwidth.

6. The method according to claim 1, wherein the obtaining, by the terminal, one or more of the subframe boundary, the system bandwidth, the starting frequency and the ending frequency of the system information area or the network area based on the received IAS comprises:
   demodulating, by the terminal, a signal corresponding to the IAS based on a pre-defined time-frequency relationship between the IAS and the signal, to obtain the system bandwidth, the starting frequency and/or the ending frequency of the system information area or the network area, wherein the signal comprises the system bandwidth, the starting frequency and/or the ending frequency of the system information area or the network area.

7. The method according to claim 1, wherein each of the plurality of IASs is used for cell synchronization, time domain/frequency domain synchronization and system information reception in cell.

8. The method according to claim 1, wherein the system information area or the network area is formed by a plurality of stations.

9. The method according to claim 8, wherein the system information area or the network area is a cell, and the plurality of stations are base stations.

10. A method for accessing a system information area or a network area, comprising:
    determining, by the system information area or the network area, a plurality of initial access signals (IAS); and
    transmitting the plurality of IASs by the system information area or the network area, wherein the IAS is used by a terminal having received the IAS to obtain one or more of a subframe boundary, a system bandwidth, a starting frequency and an ending frequency of the system information area or the network area based on the received IAS, wherein
    each IAS of the plurality of IASs comprises a synchronization signal, and the synchronization signal comprised in each IAS of the plurality of IASs comprises a primary synchronization signal (PSS) and a secondary synchronization signal (SSS);
    IASs transmitted at an identical time instant among the plurality of IASs are transmitted at any different frequency positions in a bandwidth of one downlink band occupied by the system information area or the network area, and
    IASs transmitted at different time instants among the plurality of IASs are transmitted with beams having different directions;
    each transmitting position for the plurality of IASs in a subframe is pre-defined by the system information area or the network area with the terminal.

11. The method according to claim 10, wherein the transmitting the plurality of IASs by the system information area or the network area, wherein the IAS is used by the terminal having received the IAS to obtain one or more of the subframe boundary, the system bandwidth, the starting frequency and the ending frequency of the system information area or the network area based on the received IAS comprises:
    transmitting the plurality of IASs by the system information area or the network area, wherein the IAS is used by the terminal having received the IAS to obtain the subframe boundary of the system information area or the network area based on a pre-defined transmitting position for the IAS in a subframe; or wherein the IAS is used by the terminal having received the IAS to obtain the system bandwidth, the starting frequency and/or the ending frequency of the system information area or the network area based on a pre-defined mapping relationship between the IAS and the system bandwidth; or wherein the IAS is used by the terminal having received the IAS to demodulate a signal corresponding to the IAS based on a pre-defined time-frequency relationship between the IAS and the signal and obtain the system bandwidth, the starting frequency and/or the ending frequency of the system information area or the network area, wherein the signal comprises the system bandwidth, the starting frequency and/or the ending frequency of the system information area or the network area.

12. A device for accessing a system information area or a network area, configured to implement the method according to claim 6, comprising:
    a memory;
    a processor, configured to read a program in the memory to perform following processes: determining a plurality of initial access signals (IAS), and
    transmitting the plurality of IASs, wherein the IAS is used by the terminal having received the IAS to obtain one or more of the subframe boundary, the system bandwidth, the starting frequency and the ending frequency of the system information area or the network area, based on the received IAS; and
    a transceiver, configured to receive and transmit data.

13. The device according to the claim 12, wherein the processor is further configured to transmit the plurality of IASs, wherein the IAS is used by the terminal having received the IAS to obtain the subframe boundary of the system information area or the network area based on a pre-defined transmitting position for the IAS in a subframe; or wherein the IAS is used by the terminal having received the IAS to obtain the system bandwidth, the starting frequency and/or the ending frequency of the system information area or the network area based on a pre-defined mapping relationship between the IAS and the system bandwidth; or wherein the IAS is used by the terminal having received the IAS to demodulate a signal corresponding to the IAS based on a pre-defined time-frequency relationship between the IAS and the signal to obtain the system bandwidth, the starting frequency and/or the ending frequency of the system information area or the network area, wherein the signal comprises the system bandwidth, the starting frequency and/or the ending frequency of the system information area or the network area.

14. The method according to claim 10, wherein the system information area or the network area is formed by a plurality of stations; wherein the system information area or the network area is a cell, and the plurality of stations are base stations.

15. The method according to claim 10, wherein the plurality of IASs are distinguished from each other using any one or combination of time division multiplexing, frequency domain multiplexing and code division multiplexing.

16. The method according to claim 10, wherein the system information area or the network area is formed by one or more stations and each of the plurality of IASs is transmitted by one of the stations or a group of the stations.

17. A device for accessing a system information area or a network area, comprising:
    a memory;
    a processor, configured to read a program in the memory to perform following processes: receiving a plurality of initial access signals (IAS) transmitted from the system information area or the network area; and
    obtaining one or more of a subframe boundary, a system bandwidth, a starting frequency and an ending frequency of the system information area or the network area based on the received IAS; and
    a transceiver, configured to receive and transmit data, wherein
        each IAS of the plurality of IASs comprises a synchronization signal, and the synchronization signal comprised in each IAS of the plurality of IASs comprises a primary synchronization signal (PSS) and a secondary synchronization signal (SSS);
        IASs transmitted at an identical time instant among the plurality of IASs are transmitted at any different frequency positions in a bandwidth of one downlink band occupied by the system information area or the network area, and
        IASs transmitted at different time instants among the plurality of IASs are transmitted with beams having different directions;
        each transmitting position for the plurality of IASs in a subframe is pre-defined by the system information area or the network area with the terminal.

18. The device according to claim 17, wherein the processor is further configured to: obtain the subframe boundary of the system information area or the network area based on a pre-defined transmitting position for the IAS in a subframe; or
    obtain the system bandwidth, the starting frequency and/or the ending frequency of the system information area or the network area based on a pre-defined mapping relationship between the IAS and the system bandwidth; or
    demodulate a signal corresponding to the IAS based on a pre-defined time-frequency relationship between the IAS and the signal, to obtain the system bandwidth, the starting frequency and/or the ending frequency of the system information area or the network area, wherein the signal comprises the system bandwidth, the starting frequency and/or the ending frequency of the system information area or the network area.

19. The device according to claim 17, wherein the plurality of IASs are distinguished from each other using any one or combination of time division multiplexing, frequency domain multiplexing and code division multiplexing.

20. The device according to claim 17, wherein the system information area or the network area is formed by one or more stations and each of the plurality of IASs is transmitted by one of the stations or a group of the stations.

* * * * *